United States Patent Office 2,712,500
Patented July 5, 1955

2,712,500

BEER FOAM STABILIZATION

Miles A. Weaver, Ithaca, and George K. Greminger, Jr., Midland, Mich., assignors to The Dow Chemical Company, Midland, Mich., a corporation of Delaware No Drawing. Application September 21, 1953,
Serial No. 381,494

6 Claims. (Cl. 99—48)

This invention relates to the stabilization of foam on beer, ale and similar malt beverages.

The foaming characteristic of beer is variable from batch to batch, and varies also with the age of the beer, the way in which it is poured or drawn into a glass or mug, temperature, and other factors. It often happens that, when several glasses are being filled, the foam on the first ones will have subsided before the last ones are filled, and the commercial vendor is acutely sensitive to the charge that he is serving short measure or "flat" beer. Beer consumers apparently have confidence in a beer which produces a head of foam when poured or drawn and which retains that head for a significant period thereafter. For these and related reasons, various proposals have been made of agents which can be added to beer, ale and other malt beverages to stabilize the foam. Among the agents heretofore suggested are karaya gum, carboxymethyl cellulose and carboxymethyl hydroxyethyl cellulose. The gum increases the foam life to a small extent, and so do each of the above-named cellulose ethers, but none of the previously proposed agents increases the foam life to as much as 400 per cent of normal, at the permissible low concentration.

It is accordingly the object of this invention to provide a method for stabilizing beer foam to give it a foam life from 6 to 10 or more times as long as that of an unmodified foam. A related object is to provide an agent which will not only prolong the foam life of beer, ale and other malt beverages, but will cause the foam to form as uniform, small bubbles.

The foregoing and related objects are attained, in accordance with the present invention, by incorporating in a malt beverage from 50 to 500 parts by weight, per million parts of the beverage (0.005 to 0.05 per cent) of a particular type of hydroxypropyl methyl cellulose whose 2 per cent solution in water has a viscosity at 20° C. of at least 1000, and preferably from 3000 to 5000 centipoises. The hydroxypropyl methyl cellulose which has been found useful is one which is water soluble and has from about 1.5 to 2 methoxyl groups (about 25 to 32 per cent methoxyl content) and from about 0.05 to 0.2 hydroxypropyl groups per $C_6$ unit, and which has a high enough molecular weight so that its standard aqueous solution has the above-noted viscosity. Small amounts of such a cellulose ether, added to beer before or after pasteurization, give a remarkable prolongation to the foam life, whether the beer is drawn from a barrel or poured from a bottle.

It has been found that the particular cellulose ether defined above is far superior to the numerous other water-soluble cellulose ethers in producing the desired effect. Especially surprising is its superiority to such closely related products as methyl cellulose having the same methoxyl content and to a hydroxy propyl methyl cellulose having the same methoxyl content but having over 0.2 hydroxy propyl units per $C_6$ unit.

The efficacy and advantage of the invention is shown clearly in the following table, which reports a large number of tests carried out under identical conditions, except for the agent added to the beer, using beer from the same batch in all tests. In each test, the addition agent was employed in amount of 100 parts by weight per million parts of beer (0.01 per cent). The beer was drawn at uniform rates into glasses of the same size, and the average initial height of the foam was measured. The average elapsed time before the foam collapsed was also noted. In the table, the "viscosity type" of each agent is reported as the viscosity of its 2 per cent solution in water at 20° C., except as otherwise noted.

| Addition Agent | Viscosity Type | Foam Stability, Min.: sec. | Initial Foam Height, Inch |
|---|---|---|---|
| 1. Carboxymethyl cellulose | 35 | :20 | .1875 |
| 2. Carboxymethyl methyl cellulose | 50 | 1:15 | .3125 |
| 3. Hydroxy propyl (0.1) methyl (1.8) cellulose | 50 | 1:15 | .250 |
| 4. Hydroxy propyl (0.1) methyl (1.8) cellulose | 100 | 1:30 | .250 |
| 5. Methyl cellulose | 15 | 9:00 | .250 |
| 6. Carboxymethyl methyl cellulose | 2,000 | 13:20 | .250 |
| 7. None (control) | | 15:00 | .250 |
| 8. Hydroxypropyl (0.4) methyl (1.8) cellulose | 50 | 17:00 | .3125 |
| 9. Gum karaya | | 17:20 | .250 |
| 10. Carboxymethyl hydroxyethyl cellulose | 60 | 17:20 | .250 |
| 11. Hydroxyethyl cellulose | 35 | 18:30 | .250 |
| 12. Carboxymethyl hydroxyethyl cellulose | 1,500 | 20:00 | .3125 |
| 13. Hydroxy propyl (0.4) methyl (1.8) cellulose | 4,000 | 25:30 | .3125 |
| 14. Hydroxy propyl (0.1) methyl (1.8) cellulose | 400 | 36:00 | .250 |
| 15. Methyl cellulose | 4,000 | 39:20 | .3125 |
| 16. Carboxymethyl cellulose | [1] 1,750 | 56:00 | .375 |
| 17. Hydroxyethyl cellulose | 125 | 62:10 | .375 |
| 18. Hydroxypropyl (0.1) methyl (1.8) cellulose | 1,500 | 96:00 | .375 |
| 19. Hydroxy propyl (0.1) methyl (1.8) cellulose | 4,000 | 134:30 | .625 |

[1] Viscosity determined on 1 percent solution in water at 20° C.

It is noted that agents numbered 1–6 and 8–11 either suppressed foam formation or were inert, giving no stabilization. In each instance, the higher viscosity types gave more stabilization (or less of an adverse effect) than did the low viscosity types of the same cellulose ether. Methyl cellulose (number 15) of the highest viscosity type was decidedly inferior to the agent of the present invention. Hydroxy propyl methyl cellulose containing over 0.2 hydroxy propyl groups per $C_6$ unit (agents 8 and 13) was much less effective than desired, and even the high viscosity material (13) was less effective than that of comparable viscosity having not over 0.2 hydroxy propyl groups per $C_6$ unit (agents 18 and 19). As a result of these and other tests, it has been found that hydroxy propyl methyl celluloses having viscosity ratings of at least 1000 and having 0.05 to 0.2 hydroxy propyl group and 1.5 to 2 methoxyl groups per $C_6$ unit are equivalent to one another and exhibit superior utility in the present invention. The agent of the present invention is from 1.5 to 2.5 times as effective as the best of the other agents tested.

The addition to beer or ale of the particular hydroxypropyl methyl cellulose found useful in this invention does not affect the color or clarity of the beverage, and has no detectable effect on its palatability. The cellulose ether is added to the beverage as a water solution.

We claim:

1. The method of improving the foam stability of fermented malt beverages which consists in incoporating in such a beverage from 0.005 to 0.05 per cent by weight of a hydroxypropyl methyl cellulose having from 0.05 to 0.2 hydroxypropyl and from about 1.5 to 2 methoxyl groups per $C_6$ unit, and of a type whose 2 per cent solution in water at 20° C. has a viscosity of at least 1000 centipoises.

2. The method claimed in claim 1, wherein the beverage to which the said cellulose derivative is added is beer.

3. The method claimed in claim 1, wherein the said cellulose derivative has a viscosity of from 3000 to 5000 centipoises.

4. A foam-forming fermented malt beverage containing dissolved therein from 0.005 to 0.05 per cent by weight of a hydroxypropyl methyl cellulose having from 0.05 to 0.2 hydroxypropyl and from about 1.5 to 2 methoxyl groups per $C_6$ unit, and of a type whose 2 per cent solution in water at 20° C. has a viscosity of at least 1000 centipoises.

5. The beverage claimed in claim 4, wherein the said cellulose derivative has a viscosity of from 3000 to 5000 centipoises.

6. The composition claimed in claim 4, wherein the beverage in which the said cellulose derivative is dissolved is beer.

References Cited in the file of this patent

UNITED STATES PATENTS

| | | |
|---|---|---|
| 2,159,167 | Lilienfeld | May 23, 1939 |
| 2,547,988 | Wallerstein et al. | Apr. 10, 1951 |
| 2,588,378 | Frieden et al. | Mar. 11, 1952 |
| 2,588,379 | Frieden et al. | Mar. 11, 1952 |